United States Patent
Kazmierczak et al.

[11] Patent Number: 6,005,751
[45] Date of Patent: Dec. 21, 1999

[54] RECORDING HEAD SKEWED READ GAP/ WRITE GAP POSITIONING

[75] Inventors: Frederick F. Kazmierczak, San Jose; Godfredo S. Telada, Scotts Valley, both of Calif.

[73] Assignee: Seagate Technology, Inc., Scotts Valley, Calif.

[21] Appl. No.: 08/188,427

[22] Filed: Jan. 28, 1994

[51] Int. Cl.[6] .................................................... G11B 5/55
[52] U.S. Cl. .......................................... 360/106; 360/121
[58] Field of Search .................................. 360/119, 126, 360/121, 122, 125, 105–106

[56] References Cited

U.S. PATENT DOCUMENTS

| | | | |
|---|---|---|---|
| 4,367,505 | 1/1983 | Stromsta et al. | 360/121 |
| 4,613,920 | 9/1986 | Higuchi et al. | 360/121 |
| 4,984,103 | 1/1991 | Nigam | 360/121 |
| 5,012,375 | 4/1991 | Nishimura | 360/119 |
| 5,068,760 | 11/1991 | Kira | 360/126 |
| 5,097,372 | 3/1992 | Fukazawa et al. | 360/113 |
| 5,208,715 | 5/1993 | Mowry | 360/126 |
| 5,257,149 | 10/1993 | Meyer | 360/78.14 |
| 5,289,328 | 2/1994 | Saliba | 360/121 |

*Primary Examiner*—Brian E. Miller
*Attorney, Agent, or Firm*—Kinney & Lange

[57] ABSTRACT

In a rotary actuator for positioning a dual gap magnetic head relative to a track on a rotating recording medium, a read gap is positioned in a tunnel margin of a write gap. The tunnel margin defines positioning parameters for the read gap regardless of the skew angle introduced by a rotary actuator. Error due to track misregistration is significantly reduced.

19 Claims, 4 Drawing Sheets

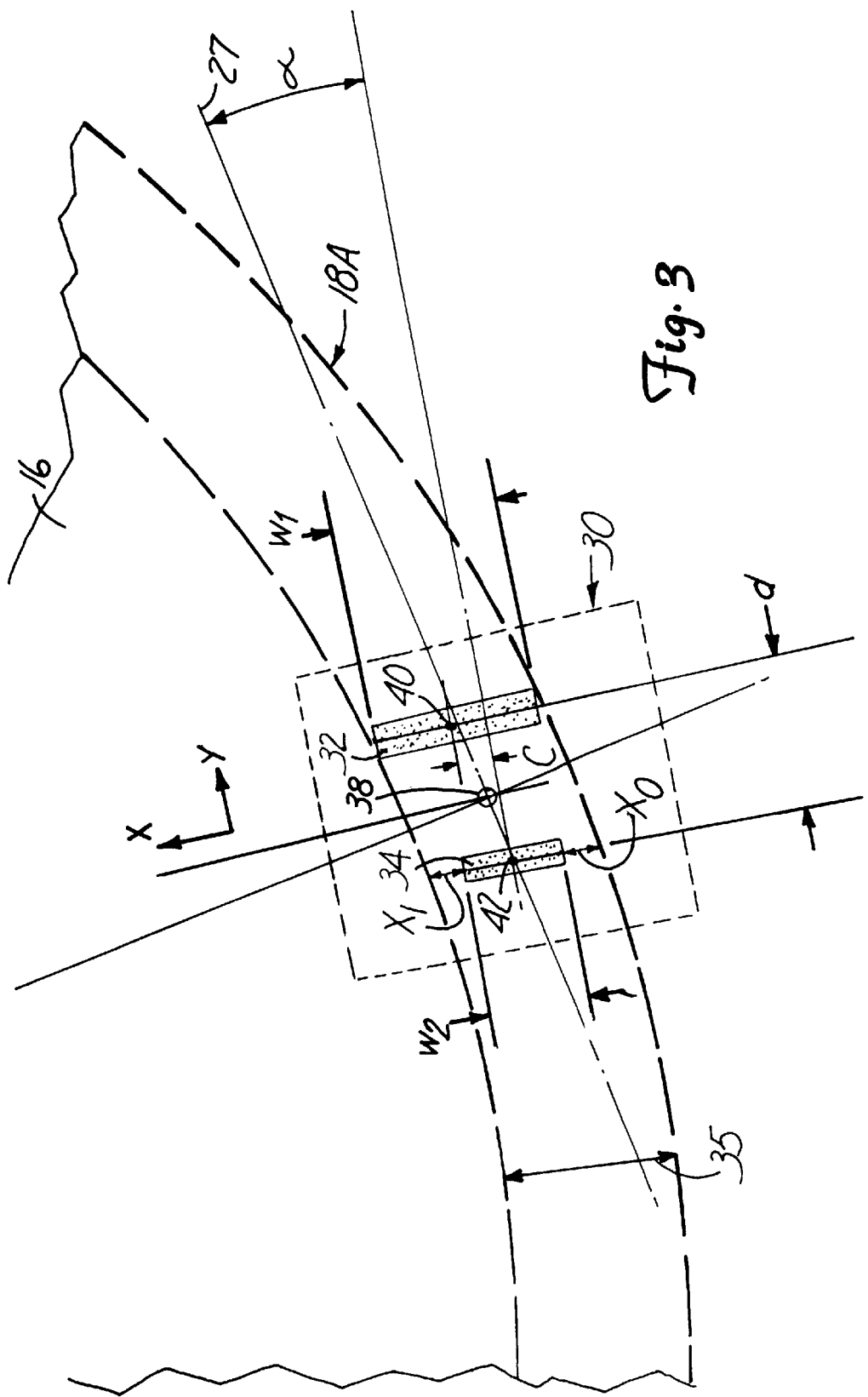

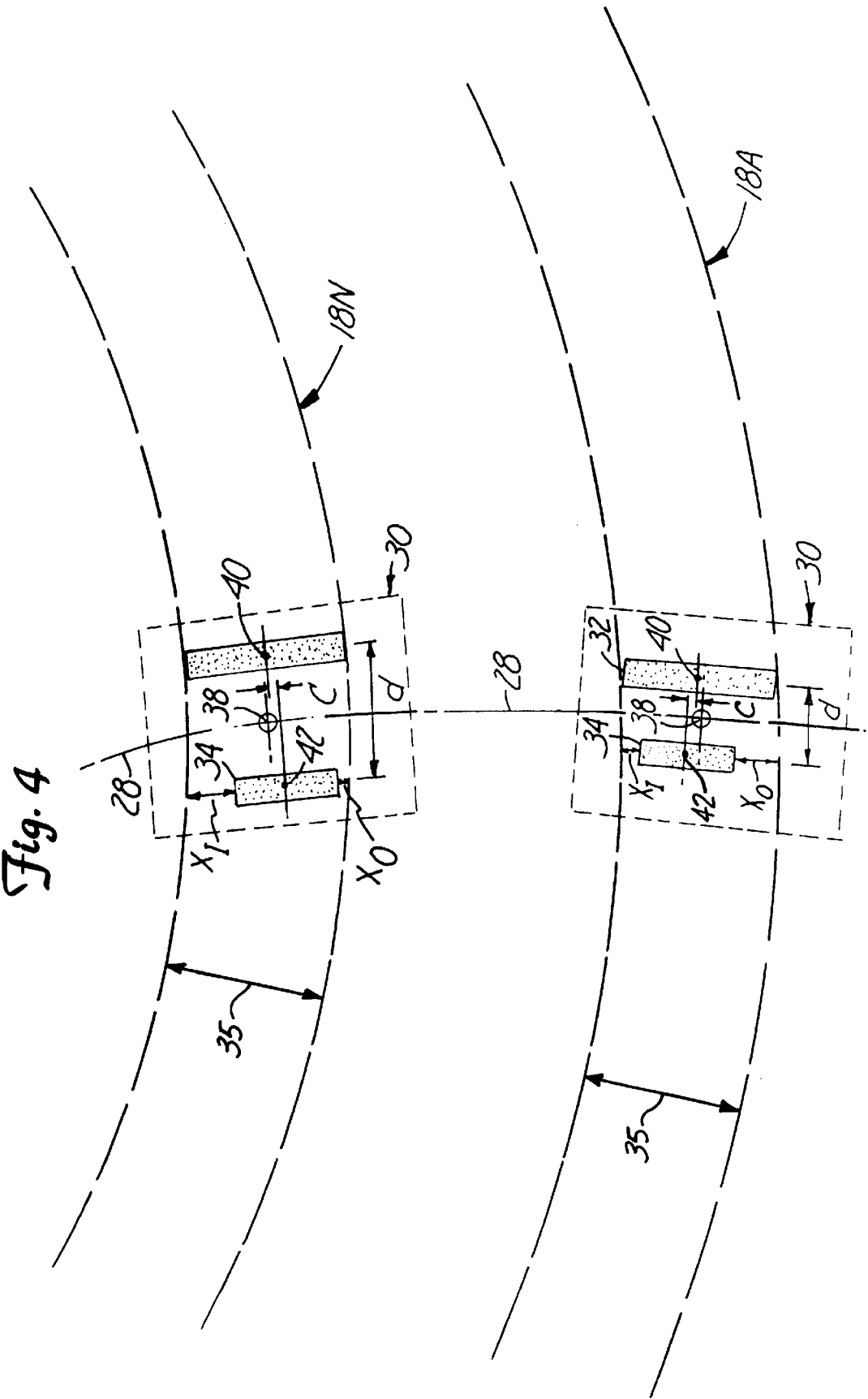

RECORDING HEAD SKEWED READ GAP/WRITE GAP POSITIONING

BACKGROUND OF THE INVENTION

This invention relates to transducing heads used with disc drive storage systems. More particularly, this invention relates to the orientation of the read gap element and the write gap in dual gap magnetic heads used with rotary actuators.

Magnetic disc drive systems have become widely accepted in the computer industry as a cost effective and reliable form of data storage. The advantages of disc drive technology over other means of data storage include an increased data transfer rate and storage capacity.

In a magnetic disc drive storage system, a magnetic disc rotates at a high speed while a magnetic read/write head "flies" over the surface of the rotating disc. As the disc rotates, aerodynamic properties cause the magnetic head to glide on a cushion of air suspended over a surface of the disc. The storage disc carries information on concentric data tracks. Information can be retrieved from the disc surface by moving the magnetic read/write head between data tracks.

In general, there are two types of actuators which are used to position the magnetic head over the disc surface, linear and rotary. A linear actuator moves back and forth linearly in a direction measured from the center of the rotating disc. Rotary actuators require less space than linear actuators, working much like a tone arm on a record player as it positions the magnetic head along an arc over the surface of a magnetic disc. The arcuate path of the rotary actuator arm, however, can introduce a skew angle between the magnetic read/write head and the data track.

A dual gap magnetic head uses a read gap for reading information and a write gap for writing information. Dual gap magnetic heads allow magnetic head designers to optimize performance of the read gap and the write gap. For example, a magnetoresistive head uses a read gap for a magnetoresistive readback element and a write gap for inductively writing magnetically encoded information. Design constraints require that the two gaps be physically separated from each other.

Performance of a dual gap magnetic head can be optimized for a particular data track on a magnetic disc by aligning the write gap with the data track when writing information and aligning the read gap with the data track when reading information. Using a linear actuator, this alignment is not a problem. However, a rotary actuator introduces a skew angle between data tracks and the axis of a dual gap head. For example, a dual gap head having 320 micro inches of separation between the two gaps and a 9° angle skew angle with a data track will have an offset of 50 micro inches.

An actuator controller which determines the position of the actuator can compensate for the skew angle introduced by a rotary actuator. Still, the skew angle significantly contributes to error due to track misregistration. Track misregistration occurs when the skew angle between the data track and the dual gap magnetic head causes the read gap to be positioned such that it is trying to read along a portion of the track where there is no information written. More particularly, when information is written onto a magnetic media disc, the write gap imprints information onto the disc in an area defined by the width of the write gap. A smaller read gap is placed behind the write gap to read information previously written onto the disc. Since the read gap is smaller than the write gap, extra data or disc space is available on both edges of the read gap. As a rotary actuator arm swings from one edge of the magnetic media disc to the other, the skew angle changes. The dynamic skew angle causes the position of the read gap to change relative to the write gap. In some rotary actuator positions, the read gap may actually swing out beyond the write gap. When this occurs, the read gap is attempting to read information in a location where there is no data written onto the magnetic media disc. Alternatively, the read gap may read undesired information from an adjacent data track.

SUMMARY OF THE INVENTION

The present invention defines an area called a shadow or "tunnel margin" behind a write gap of a dual gap magnetic head in which the read gap should be positioned during a read operation using a rotary actuator. The tunnel margin is defined by constraints including separation between the write gap and the read gap, vertical offset between a center of the write gap and a center of the read gap, the instantaneous skew angle of the data track, the optimum axis of the dual gap magnetic head, the width of the write gap and the width of the read gap. By ensuring that the read gap remains within the parameters defined by the tunnel margin, track misregistration can be significantly reduced.

BRIEF DESCRIPTION OF THE DRAWINGS

FIG. 3 shows read gap position with the tunnel margin as it varies according to skew angle.

FIG. 4 shows a read gap positioned within the tunnel margin as the instantaneous skew angle varies with the movement of the rotarty actuator.

DETAILED DESCRIPTION OF THE PREFERRED EMBODIMENTS

Figure 1:
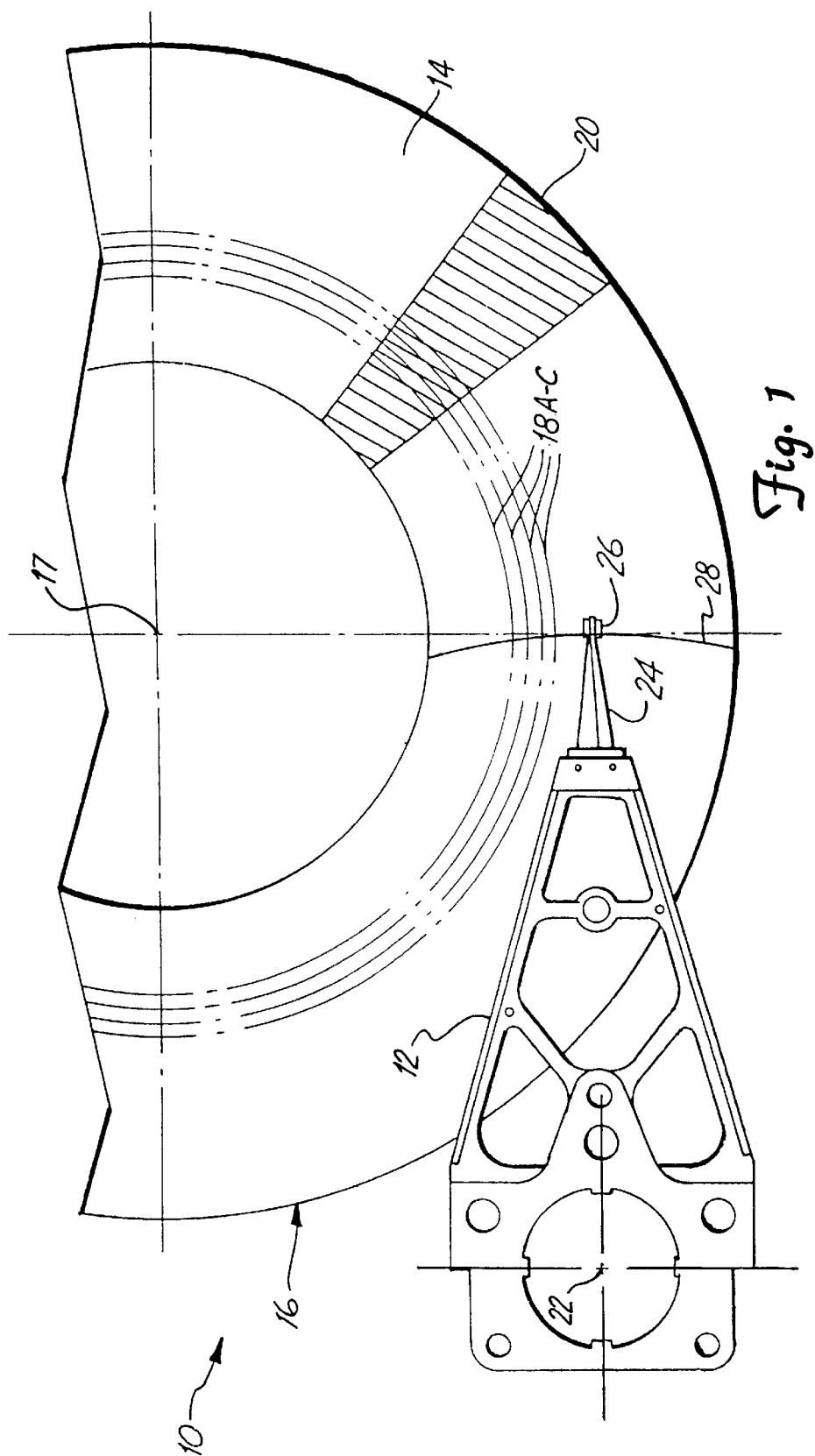
FIG. 1 shows a magnetic disc storage system.

FIG. 1 shows a top plan view of magnetic storage system 10. Rotary arm 12 is shown positioned over surface 14 of magnetic storage disc 16 which rotates about a spindle axis 17. Surface 14 is divided into data tracks 18 and data sectors 20.

Rotary arm 12 rotates about an axis of rotation 22. By rotating rotary arm 12 about axis of rotation 22, flexure arm 24 moves between adjacent tracks 18A–C of storage disc 16. Flexure arm 24 carries dual gap magnetic head assembly 26. This causes magnetic head assembly 26 to move along arc 28 as it shifts between data tracks 18A–C on disc 16.

Magnetic head assembly 26 includes slider 30 (shown in FIGS. 2–4) having aerodynamic properties which allow it to fly over the surface of storage disc 16. Flexure arm 24 is spring-loaded and opposes aerodynamic lift from slider 30.

Figure 2:
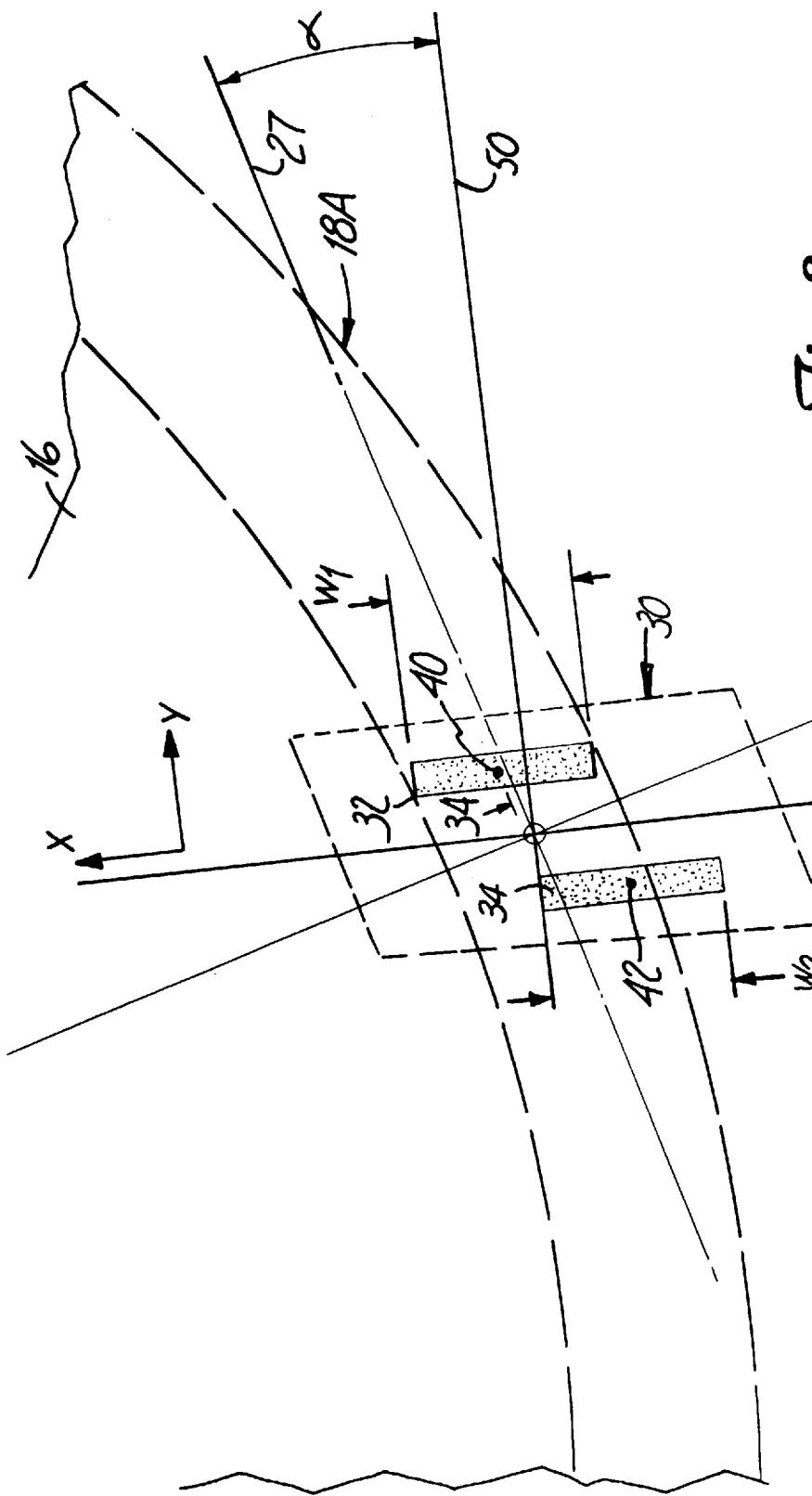
FIG. 2 shows a prior art dual gap magnetic head as it positioned over a data track of a magnetic disc storage system.

FIG. 2 shows a top plan view of slider 30 of the prior art as it is positioned over track 18A on disc 16. Slider 30 includes write gap 32 and read gap 34. Also shown is skew angle α, track center 38, write gap center 40, read gap center 42, write gap width $W_1$ and read gap width $W_2$. Skew angle α is measured as an angle between the tangent of the center line of data track 18A and a line perpendicular to the write gap width $W_1$ and read gap width $W_2$. The tangent to the center line of data track 18A is line 27 from track center 38. The line perpendicular to the gap width is line 50.

Referring to the figure, slider 30 is shown positioned over data track 18A. At this particular instantaneous skew angle α, a portion of read gap 34 extends beyond the write zone (or shadow of the write gap width $W_1$) of write gap 32. As shown in the figure, a portion of read gap 34 is attempting to read information from an adjacent track (not shown) where information is not written. In other words, a portion of read gap 34 extends beyond the shadow of the width $W_1$ of write gap 32 for this particular skew angle α. In doing so, read gap 34 is introducing track misregistration error into the magnetic storage system.

FIG. 3 is a top plan view of a preferred embodiment of the present invention. Here, slider 30 is also shown positioned over data track 18A on magnetic disc 16. In this figure, slider 30 includes write gap 32 and read gap 34 which is positioned entirely within shadow or tunnel margin 35 of write gap 32 in accordance with the present invention. Tunnel margin 35 is the width of the actual information written to magnetic disc 16. Also shown is instantaneous skew angle α, track center 38, write gap center 40, read gap center 42, write gap width $W_1$, read gap width $W_2$, gap separation d and tunnel margin parameters $X_I$ and $X_O$. In addition, an x,y coordinate system is shown where the y direction is perpendicular to the write gap width $W_1$ and the x direction is parallel to the write gap width $W_1$. For reference, the y direction will be referred to as horizontal and the x direction will be referred to as vertical.

Tunnel margin 35 defines the area within which read gap 34 must be located in order to reduce the effects of track misregistration during readback. The tunnel margin 35 has an inner buffer area $X_I$, an outer buffer area $X_O$ and an area where the read gap passes. Two of the parameters of tunnel margin 35 are defined by the following two equations:

$$X_I = -d\sin\alpha + \left[C + \frac{W_1 - W_2}{2}\right]\cos\alpha$$

$$X_O = d\sin\alpha + \left[C - \frac{W_1 - W_2}{2}\right]\cos\alpha$$

where d is gap separation which is measured as a horizontal distance between write gap center 40 and read gap center 42, α is the instantaneous skew angle, c is offset which is measured as a vertical distance between write gap center 40 and read gap center 42, $W_1$ is write gap width and $W_2$ is read gap width.

$X_I$ and $X_O$ must always exhibit positive values. When $X_I$ and $X_O$ are positive, read gap 34 is within tunnel margin 35 of write gap 32. As long as read gap 34 remains in tunnel margin 35 during readback, track misregistration error is significantly reduced. When read gap 34 remains within tunnel margin 35 of write gap 32, it will be positioned to read information written by write gap 32 regardless of the value of instantaneous skew angle α. In addition, in the present invention, the read gap is of such size and position relative to the write gap, that $X_I$ and $X_O$ are larger than position errors produced by the disk drive system at all values of instantaneous skew angle α. In this manner, read gap 34 will not introduce track misregistration error into the magnetic disc storage system.

One typical disc drive, Model Number 5T9540 available from Seagate Technology, Inc. of Scotts Valley, Calif., has a write gap width, $W_1$, of 7.3 μm, a separation, d, of 1 μm and an offset, C, of 2.4 μm. For this type of drive, skew angle α varies between 8° and 22° and combined positioning errors, $X_O$ and $X_I$, are about 1.20 μm. In order to determine the proper size for read gap width $W_2$, the above equations are used twice in the present invention; once with an instantaneous skew angle of 8° and once with a skew angle of 22°.

The known values are inserted into the equations and the equations are reduced to a value for the read gap width $W_2$. The smallest read gap width $W_2$ obtained from the four equations is the proper read gap width for this particular slider. The four equations and their solutions for $W_2$ are shown below:

$$X_I = 1.20\ \mu m = -1\ \mu m\ \sin 8° + \left(2.4\ \mu m + \frac{7.3\ \mu m - W_2}{2}\right)\cos 8°$$

$$W_2 = 9.40\ \mu m$$

$$X_O = 1.20\ \mu m = 1\ \mu m\ \sin 8° + \left(2.4\ \mu m + \frac{7.3\ \mu m - W_2}{2}\right)\cos 8°$$

$$W_2 = 4.64\ \mu m$$

$$X_I = 1.20\ \mu m = -1\ \mu m\ \sin 22° + \left(2.4\ \mu m + \frac{7.3\ \mu m - W_2}{2}\right)\cos 22°$$

$$W_2 = 8.70\ \mu m$$

$$X_O = 1.20\ \mu m = 1\ \mu m\ \sin 22° + \left(2.4\ \mu m + \frac{7.3\ \mu m - W_2}{2}\right)\cos 22°$$

$$W_2 = 4.28\ \mu m$$

For the parameters given above, the read gap width $W_2$ should be no greater than 4.28 μm, since this is the largest possible read gap width which can be used in this slider/drive configuration without introducing misregistration errors. Additionally, for a given read gap width, write gap width, separation, minimum and maximum skew angles, and expected positioning errors, the present invention permits determination of the proper offset between the read head and the write head. It will be appreciated by those skilled in the art that the value of any missing parameter may be determined from the values of the remainder of the parameters.

FIG. 4 shows the position of read gap 34 within tunnel margin 35 for two different instantaneous skew angles (not shown). At track 18A of magnetic disc 16, read gap 34 is shifted towards the inside edge of track 18A by the instantaneous skew angle introduced by the rotary actuator arm. Note that read gap 34 is still positioned within tunnel margin 35. Although the value of $X_I$ is noticeably smaller than the value of $X_O$ along track 18A, both $X_I$ and $X_O$ are positive. Thus, read gap 34 is positioned along an area of track 18A where information has been written by write gap 32. When slider 30 is moved to track 18N, however, the instantaneous skew angle changes. The change in the instantaneous skew angle causes read gap 34 to be positioned closer to the outside edge of track 18N than it was to the outside edge of track 18A. When read gap 34 is positioned over track 18N, the value of $X_I$ is greater than the value of $X_O$. However, both $X_I$ and $X_O$ are positive values. Hence, read gap 34 is positioned over a portion of data track 18N in which information has been written. At both track 18A and track 18N, $X_I$ and $X_O$ are both larger then the total of all position errors for read gap 34 at those tracks.

A dual gap magnetic head made in accordance with the present invention has a read gap which is always positioned over a written portion of a data track regardless of the instantaneous skew angle introduced by a rotary actuator. The advantages of the invention include a cost effective, simple means to reduce track misregistration in any medium in which a rotary actuator is used.

Although the present invention has been described with reference to preferred embodiments, workers skilled in the art will recognize that changes may be made in form and detail without departing from the spirit and scope of the invention.

What is claimed is:

1. In a rotary actuator for positioning a dual gap transducing head relative to a track on a rotating recording medium, the medium rotating about a first axis and the rotary actuator moving the head adjacent the medium about a second axis parallel to the first axis between an inner radial position adjacent an inner-most track and an outer radial position adjacent an outer-most track on the medium, the head comprising:

means for writing information on a recording medium, the means for writing information defining a shadow over the track, the shadow having a width comprising the radial width of information written on the track; and means for reading information from the recording medium wherein the reading means is spaced from the writing means and located completely within the shadow of the writing means at all positions between the inner and outer radial positions over the rotating recording medium.

2. The transducing head of claim 1 wherein the width of the shadow varies with a radial position of the head over the medium.

3. The transducing head of claim 2 wherein the means for reading information moves radially within the shadow as the head moves in a radial arc across the medium.

4. The transducing head of claim 3 wherein position errors are no greater than a distance, $X_O$, from an outer edge of the means for reading information to an outer edge of the shadow defined as:

$$X_O = d\sin\alpha + \left[C - \frac{W_1 - W_2}{2}\right]\cos\alpha$$

wherein d is a distance of separation between the means for reading information and the means for writing information, $\alpha$ is an instantaneous skew angle between a tangent to the track and a line perpendicular to a width of the means for writing information, C is an offset between the means for reading information and the means for writing information in a direction parallel to the width of the means for writing information, $W_1$ is the width of the means for writing information and $W_2$ is a width of the means for reading information.

5. The transducing head of claim 3 wherein position errors are no greater than a distance, $X_I$, from an inner edge of the means for reading information to an inner edge of the shadow defined as:

$$X_I = -d\sin\alpha + \left[C + \frac{W_1 - W_2}{2}\right]\cos\alpha$$

wherein d is a distance of separation between the means for reading information and the means for writing information, $\alpha$ is an instantaneous skew angle between a tangent to the track and a line perpendicular to a width of the means for writing information, C is an offset between the means for reading information and the means for writing information in a direction parallel to the width of the means for writing information, $W_1$ is the width of the means for writing information and $W_2$ is a width of the means for reading information.

6. In a rotary actuator for positioning a magnetic head relative to tracks on a rotating recording medium, the medium rotating about a first axis and the actuator moving the head adjacent a surface of the medium about a second axis parallel to the first axis between an inner radial position adjacent an inner-most track and an outer radial position adjacent an outer-most track on the medium, the magnetic head comprising:

a write gap for writing information onto a first track of the rotating recording medium, the write gap having a width, the write gap casting a shadow on the rotating recording medium proportional to the width of the write gap times a cosine of an instantaneous skew angle between a tangent of the track and a line perpendicular to the width of the write gap; and a read gap having a width aligned parallel to the width of the write gap, the read gap being spaced from the write gap adjacent the rotating recording medium to read information only from the shadow of the write gap at all positions between the inner and outer radial positions over the rotating recording medium.

7. The magnetic head of claim 6 wherein the shadow of the write gap has a width defined by:

a read gap shadow proportional to the width of the read gap times a cosine of an instantaneous skew angle between a tangent of the center of the track and a line perpendicular to the width of the read gap, an inside buffer area between an inside edge of the write gap shadow and an inside edge of the read gap shadow; and an outside buffer area between an outside edge of the write gap shadow and an outside edge of the read gap shadow.

8. The magnetic head of claim 7 wherein the inside buffer area, $X_I$, is defined by:

$$X_I = -d\sin\alpha + \left[C + \frac{W_1 - W_2}{2}\right]\cos\alpha$$

wherein d is a separation between the means for reading information and the means for writing information, $\alpha$ is an instantaneous skew angle between a tangent to the track and a line perpendicular to a width of the means for writing information, C is an offset of the means for reading information and the means for writing information in a direction parallel to the width of the means for writing information, $W_1$ is the width of the means for writing information and $W_2$ is the width of the means for reading information.

9. The magnetic head of claim 8 wherein the inside buffer area is larger than a combined positioning error for all positions of the magnetic head over the disk.

10. The magnetic head of claim 7 wherein the outside buffer area, $X_O$, is defined by the following parameters:

$$X_O = d\sin\alpha + \left[C - \frac{W_1 - W_2}{2}\right]\cos\alpha$$

wherein d is a separation between the means for reading information and the means for writing information, $\alpha$ is an instantaneous skew angle between a tangent to the track and a line perpendicular to a width of the means for writing information, C is an offset of the means for reading information and the means for writing information in a direction parallel to the width of the means for writing information, $W_1$ is the width of the means for writing information and $W_2$ is the width of the means for reading information.

11. The magnetic head of claim 10 wherein the outside buffer area is larger than a combined positioning error for all positions of the magnetic head over the disk.

12. The magnetic head of claim 7 wherein the size of the inside buffer area and the size of the outside buffer area change as the magnetic head transverses the recording medium.

13. In a rotary actuator for positioning a dual gap transducing head relative to a track on a rotating recording medium, the medium rotating about a first axis and the actuator moving the transducing head adjacent a surface of the medium about a second axis parallel to the first axis between an inner radial position adjacent an inner-most track and an outer radial position adjacent an outer-most track on the medium, a method for reducing track misregistration comprises:

positioning a write gap for writing information on the recording medium adjacent to the track, the write gap defining a tunnel margin comprising the region where the write gap passes over the recording medium; and positioning a read gap for detecting information on the recording medium, the read gap positioned entirely in the tunnel margin of the write gap at all positions between the inner and outer radial positions over the rotating recording medium, the read gap being spaced from the write gap.

14. The method of claim 13 wherein the tunnel margin of the write gap varies in size as the transducing head transverses the recording medium.

15. The method of claim 13 wherein the tunnel margin of the write gap has a width defined by:

a read gap shadow, comprising the region where the read gap passes over the recording medium;

an inside buffer region between an inside edge of the write gap tunnel margin and an inside edge of the read gap shadow; and an outside buffer region located between an outside edge of the write gap tunnel margin and an outside edge of the read gap shadow.

16. The magnetic head of claim 15 wherein the inside buffer region, $X_I$, is defined by:

$$X_I = -d\sin\alpha + \left[C + \frac{W_1 - W_2}{2}\right]\cos\alpha$$

wherein d is a distance of separation between the means for reading information and the means for writing information, $\alpha$ is an instantaneous skew angle between a tangent to the track and a line perpendicular to the width of the means for writing information, C is an offset of the means for reading information and the means for writing information in a direction parallel to the width of the means for writing information, $W_1$ is the width of the means for writing information and $W_2$ is a width of the means for reading information.

17. The magnetic head of claim 16 wherein the inside buffer region is larger than a combined positioning error for all positions of the magnetic head over the disk.

18. The magnetic head of claim 15 wherein the outside buffer region, $X_O$, is defined by the following parameters:

$$X_O = d\sin\alpha + \left[C - \frac{W_1 - W_2}{2}\right]\cos\alpha$$

wherein d is a distance of separation between the means for reading information and the means for writing information, $\alpha$ is an instantaneous skew angle between a tangent to the track and a line perpendicular to the width of the means for writing information, C is an offset of the means for reading information and the means for writing information in a direction parallel to the width of the means for writing information, $W_1$ is the width of the means for writing information and $W_2$ is a width of the means for reading information.

19. The magnetic head of claim 18 wherein the outside buffer region is larger than a combined positioning error for all positions of the magnetic head over the disk.

* * * * *